US008638979B2

(12) United States Patent
Singhal et al.

(10) Patent No.: US 8,638,979 B2
(45) Date of Patent: Jan. 28, 2014

(54) METHOD AND APPARATUS FOR COMPOSING IMAGE

(75) Inventors: Nitin Singhal, Gyeonggi-do (KR); Sung-Dae Cho, Yongin-si (KR); In-Kyu Park, Seoul (KR); Man-Hee Lee, Incheon (KR)

(73) Assignees: Samsung Electronics Co., Ltd (KR); Inha-Industry Partnership Institute (KR)

( * ) Notice: Subject to any disclaimer, the term of this patent is extended or adjusted under 35 U.S.C. 154(b) by 336 days.

(21) Appl. No.: 13/015,261

(22) Filed: Jan. 27, 2011

(65) Prior Publication Data

US 2011/0200273 A1    Aug. 18, 2011

(30) Foreign Application Priority Data

Feb. 16, 2010    (KR) ........................ 10-2010-0013885

(51) Int. Cl.
*G06K 9/00*          (2006.01)
(52) U.S. Cl.
USPC ........... 382/100; 382/115; 382/278; 382/282; 382/284; 340/5.52; 340/5.81
(58) Field of Classification Search
USPC ......... 382/115, 118, 278, 282, 284; 340/5.52, 340/5.81, 5.82, 5.83
See application file for complete search history.

(56) References Cited

U.S. PATENT DOCUMENTS

| 5,600,767 | A | 2/1997 | Kakiyama et al. | |
|---|---|---|---|---|
| 6,919,892 | B1 * | 7/2005 | Cheiky et al. | 345/473 |
| 6,944,319 | B1 * | 9/2005 | Huang et al. | 382/118 |
| 7,027,054 | B1 * | 4/2006 | Cheiky et al. | 345/473 |
| 7,142,697 | B2 * | 11/2006 | Huang et al. | 382/118 |
| 7,680,314 | B2 * | 3/2010 | Hong | 382/131 |
| 7,783,096 | B2 * | 8/2010 | Chen et al. | 382/128 |
| 7,784,107 | B2 * | 8/2010 | Kley | 850/4 |
| 7,785,098 | B1 * | 8/2010 | Appleby et al. | 425/470 |
| 7,813,822 | B1 * | 10/2010 | Hoffberg | 700/94 |
| 8,176,426 | B2 * | 5/2012 | Mitsuhashi | 715/730 |
| 2008/0205789 | A1 | 8/2008 | Ten Kate et al. | |
| 2009/0213110 | A1 | 8/2009 | Kato et al. | |

FOREIGN PATENT DOCUMENTS

| KR | 1019950025592 | 9/1995 |
|---|---|---|
| KR | 1020030090889 | 12/2003 |
| KR | 1020070026806 | 3/2007 |
| KR | 1020070108195 | 11/2007 |

\* cited by examiner

*Primary Examiner* — Yosef Kassa
(74) *Attorney, Agent, or Firm* — The Farrell Law Firm, P.C.

(57) ABSTRACT

Provided are a method and apparatus for combining and composing a plurality of images into one image. An image processing unit calculates importance levels of the plurality of input images, respectively, according to selection criteria, selects at least two important images from among the plurality of input images according to the calculated importance levels, determines Regions Of Interest (ROIs) of the important images, selects the ROIs in one canvas, arranges corresponding important images at positions corresponding to the selected ROIs, and composes the arranged important images into one image.

16 Claims, 13 Drawing Sheets
(10 of 13 Drawing Sheet(s) Filed in Color)

METHOD AND APPARATUS FOR COMPOSING IMAGE

PRIORITY

This application claims priority under 35 U.S.C. §119(a) to an application entitled "Method and Apparatus for Composing Image" filed in the Korean Intellectual Property Office on Feb. 16, 2010, and assigned Serial No. 10-2010-0013885, the entire disclosure of which is incorporated herein by reference.

BACKGROUND OF THE INVENTION

1. Field of the Invention

The present invention generally relates to an image composition method and apparatus, and, more particularly, to a method and apparatus for composing a plurality of images into one image.

2. Description of the Related Art

Recently, with the development of digital camera technology, digital cameras are available at a lower price than before. Additionally, with the development of integration technology, use of mobile terminals equipped with digital cameras has increased. In particular, as mobile terminals can perform visual communication, it is now common for a mobile terminal to be equipped with a digital camera.

As a mobile terminal is equipped with a digital camera, it becomes possible for the user to acquire digital images at any place at any time in his/her daily life, so that the number of images acquired by the user is exponentially increasing. In a flood of images, it is necessary to develop a technology for easily and efficiently browsing and viewing a desired image.

As a method for efficiently managing a great number of images, there is a collage image composition method. A collage image composition is a composition of a plurality of images into one image so as to be able to browse the plurality of images through the use of the one composed image.

Generally, the collage image composition uses various and complex image processing schemes and a global energy optimization method in order to compose a plurality of images into one image. For this reason, a large amount of operations are required for image composition, so that there is it is difficult to apply the conventional collage image composition technology to mobile terminals. This is because, when a conventional collage image composition is performed in a mobile terminal, too much time is required for performing complex image processing and global optimization in the mobile terminal. Moreover, when the image processing procedure is simplified, the quality of a collage image generated as a result of composition may deteriorate.

SUMMARY OF THE INVENTION

Accordingly, the present invention has been made to solve the above-mentioned problems occurring in the prior art, and the present invention provides a method and apparatus for efficiently composing a plurality of images into one image through a simple algorithm.

Also, the present invention provides a method and apparatus for composing a plurality of images into one image through a simple algorithm at high speed.

Additionally, the present invention provides a method and apparatus for ensuring the quality of a composed result image while rapidly composing a plurality of images into one image.

In accordance with an aspect of the present invention, there is provided a method for composing a plurality of images into one image in an image processing apparatus, the method including calculating importance levels of a plurality of input images, respectively, according to selection criteria, and selecting at least two important images from among the plurality of input images according to the calculated importance levels; determining Regions Of Interest (ROIs) of the important images; selecting the ROIs in one canvas; and arranging corresponding important images at positions corresponding to the selected ROIs, and composing the arranged important images into one image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the present invention will be more apparent from the following detailed description taken in conjunction with the accompanying drawings, in which.

DETAILED DESCRIPTION OF THE EMBODIMENTS OF THE PRESENT INVENTION

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

The present invention provides a method for combining a plurality of images to generate a composite image. In the following description, the term "collage image" represents a resultant image generated by composing a plurality of images.

According to an embodiment of the present invention, a process for generating a collage image includes a total of four steps. First, important images, which are likely to have a high level of user preference, are selected from among input images, and a Region Of Interest (ROI) including most information of each selected important image is set in the important image. Thereafter, the important images are arranged on a canvas by taking the sizes of obtained ROIs into consideration, and the important images arranged on the canvas are smoothly composed, so that one collage image representing the input images is generated.

A collage image may be used to rapidly and efficiently browse a plurality of images, and may be used as a representative image of the plurality of images.

Figure 1:
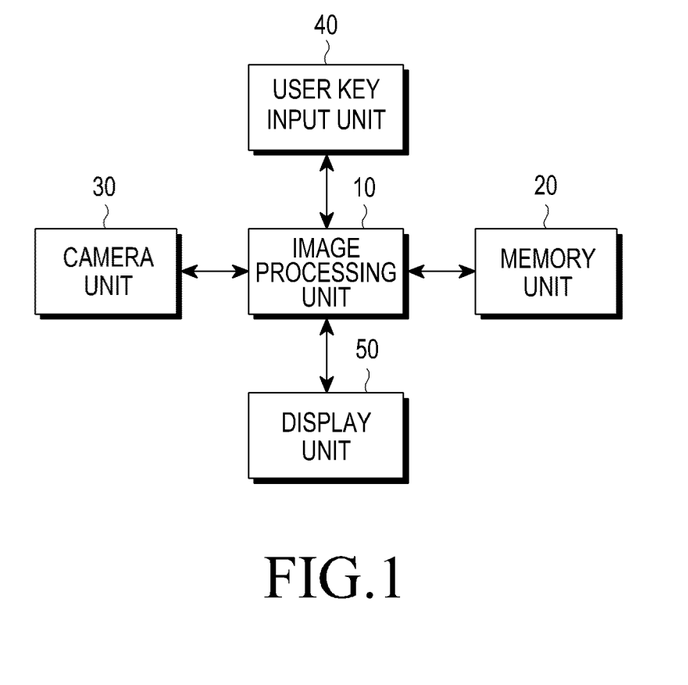
FIG. 1 is a block diagram illustrating the configuration of an image processing apparatus according to an embodiment of the present invention.

An image processing apparatus, to which the present invention is applied, is illustrated in FIG. 1. FIG. 1 is a block diagram illustrating the configuration of an image processing apparatus according to an embodiment of the present invention. The image processing apparatus may be included in various mobile terminals, and may cooperate with functions included in each corresponding mobile terminal.

Referring to FIG. 1, the image processing apparatus includes an image processing unit 10, a memory unit 20, a camera unit 30, a key input unit 40, and a display unit 50.

The display unit 50 displays data output from the image processing unit 10 or an image photographed by the camera unit 30.

The memory unit 20 stores programs for operation and control of the image processing unit 10, reference data, various updatable data for storage, and is provided as a working memory of the image processing unit 10. Moreover, the memory unit 20 stores a plurality of images.

The camera unit 30 photographs a subject and outputs a generated image to the image processing unit 10 according to the control of the image processing unit 10.

The image processing unit 10 controls the overall operation of the image processing apparatus, and combines and composes a plurality of images to generate one collage image according to an embodiment of the present invention. The operation of the image processing unit 10 to generate a collage image according to an embodiment of the present invention is illustrated in FIG. 3.

Figure 3:
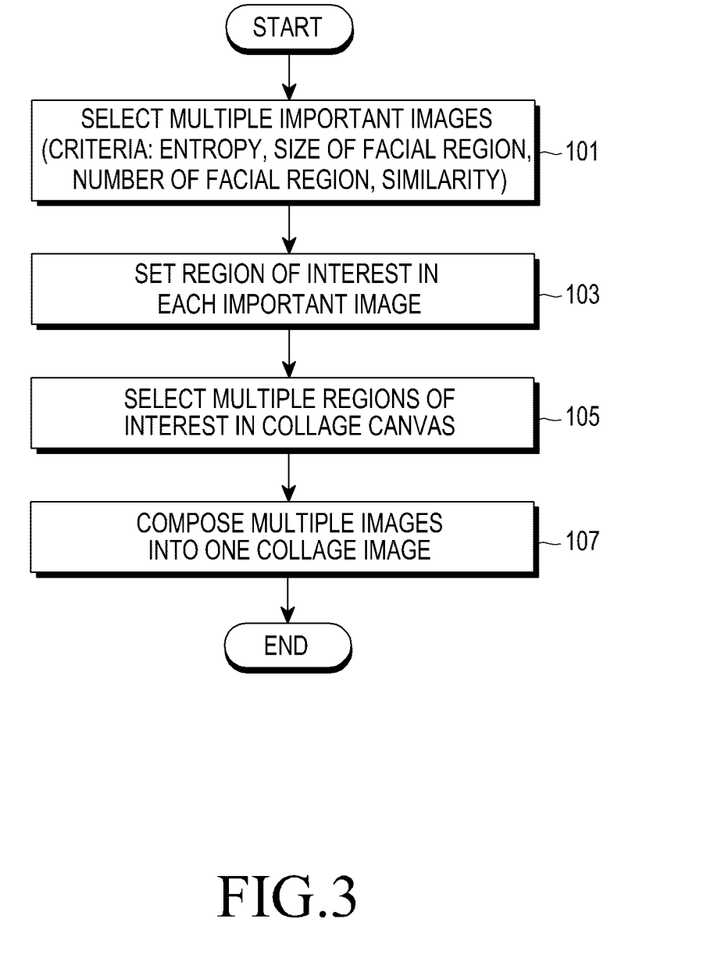
FIG. 3 is a flowchart illustrating the operation of the image processing apparatus according to an embodiment of the present invention.

Referring to FIG. 3, in step 101, when the number of input images which are selected as candidates for composition to form a collage image is larger than the maximum number of individual images which can actually be composed into a collage image, the image processing unit 10 selects a part of the input images as important images to be composed. Selection criteria for the important images may include the entropy of each input image, the number and sizes of facial regions included in each input image, similarity levels between the input images, and the like. That is, the image processing unit 10 calculates an importance level of each input image based on the selection criteria, and selects a plurality of images having high importance levels as important images.

Thereafter, in step 103, the image processing unit 10 sets an ROI in each important image. Facial regions or entropy distribution is used as criteria for setting of ROIs.

When ROIs have been set in every important image, the image processing unit 10 proceeds to step 105, where the image processing unit 10 selects a plurality of ROIs on a canvas for image composition, and controls the positions and sizes of the ROIs.

In step 107, the image processing unit 10 arranges relevant important images in the positions of the selected ROIs, and composes the plurality of important images into one collage image.

Figure 2:
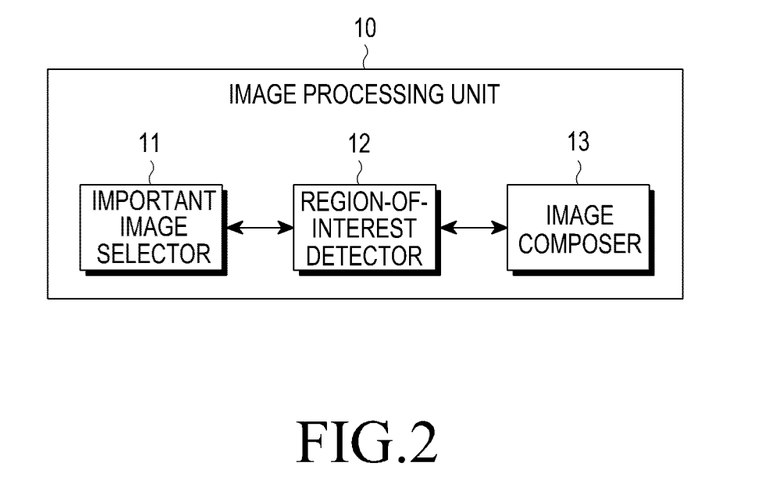
FIG. 2 is a block diagram illustrating the configuration of an image processing unit according to an embodiment of the present invention.

The configuration of the image processing unit 10 performing the aforementioned operations is illustrated in FIG. 2. FIG. 2 is a block diagram illustrating the configuration of the image processing unit 10 according to an embodiment of the present invention. The image processing unit 10 includes an important image selector 11, a Region-Of-Interest detector 12, and an image composer 13.

The important image selector 11 performs the process of step 101. That is, when the number of input images which are selected as candidates for composition to form a collage image is larger than the maximum number of individual images which can be actually composed into a collage image, the important image selector 11 selects a part of the input images as important images to be composed. For example, a collage image composed of nine images is to be generated with the images selected among images stored in a specific folder, and the specific folder stores more than nine images, all the image stored in the specific folder correspond to input images, respectively, and the important image selector 11 selects nine images among the input images, as important images.

In one embodiment, the important images composed into a collage image are either images which can represent the input images, or images including various information. Generally, the larger the number of colors contained in an image is, the higher the entropy of the image is. Additionally, it is necessary to distinguish between an image including a unique subject and images including similar subjects. Also, an image of a person may include more information than, for example, a landscape image.

Therefore, according to an embodiment of the present invention, the important image selector 11 uses the entropy of each image, similarity levels between images, the number and sizes of facial regions included each image, and the like as the selection criteria for important images, wherein the important image selector 11 may combine two or more selection criteria and select important images based on derived importance levels. According to an embodiment of the present invention, it is assumed that an image having a high entropy, an image having a large facial region, an image having a large number of facial regions, and an image including a unique image are images having a high importance level. However, weights of the selection criteria for determining importance levels may vary according to various embodiments of the present invention.

According to an embodiment of the present invention, the important image selector 11 uses a local entropy or an importance level map (e.g., a saliency map) in order to calculate the entropies of images. An entropy calculation scheme using a local entropy is simpler than an entropy calculation scheme using a saliency map, in terms of the algorithm used.

In the case of calculating the entire entropy of an image by means of a local entropy, the important image selector 11 calculates a local entropy using a local-window-based histogram of a and b channels in Lab color space, normalizes the sum of entropies of all pixels of an image by the size of the image, and calculates a final entropy of the image. Note, Lab color space is a color components space with dimension L for lightness and "a" and "b" for the color-opponent dimension based on non-linearly compressed Commission Internationale de L'Eclairage (CIE) XYZ color space coordinates.

In the case of using a saliency map, the important image selector 11 generates a saliency map of an image by means of a Gaussian pyramid of the L channel and ab channel in Lab color space, and then, in the same manner as above, normalizes the sum of importance levels of the entire image by the size of the image and calculates a final entropy of the image.

Figure 4A:
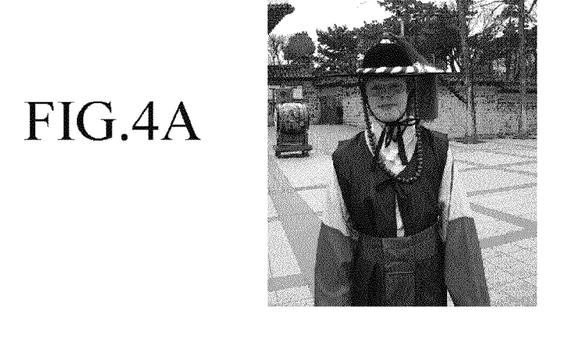
FIGS. 4A to 4C are views illustrating entropies of an image according to an embodiment of the present invention.
Figure 4B:
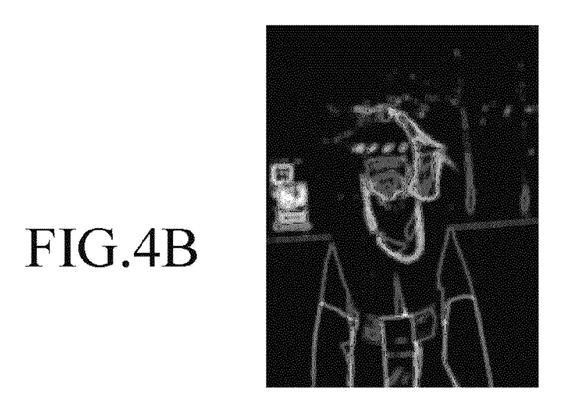
Figure 4C:
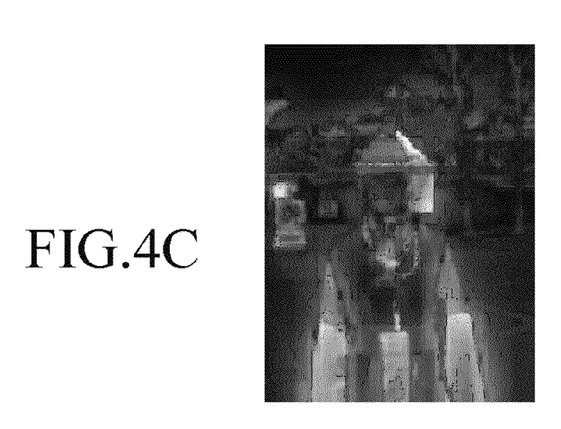

FIGS. 4A to 4C illustrate resultant entropy images according to the aforementioned schemes. FIG. 4A is an original image, FIG. 4B is a resultant local entropy image based on a histogram, and FIG. 4C is a resultant entropy image using a saliency map.

According to an embodiment of the present invention, a hybrid graph is used to detect similarity levels between images. Accordingly, the important image selector 11 makes a graph of the characteristics of each image through the use of a Modified Color Adjacency Graph (MCAG) expressing color distribution of each image itself and a Spatial Variance Graph (SVG) expressing spatial distribution, and compares graphs between images, thereby digitizing similarity levels between images.

The similarly levels between images is calculated by Equation (1).

$$\text{Similarity}(i, j) = \alpha \frac{\sum_{\text{all element}} \min(M_i^{MCAG}, M_j^{MCAG})}{\sum_{\text{all element}} (M_i^{MCAG} + M_j^{MCAG} - \min(M_i^{MCAG}, M_j^{MCAG}))} + \beta \frac{\sum_{\text{all element}} \min(M_i^{SVG}, M_j^{SVG})}{\sum_{\text{all element}} (M_i^{SVG} + M_j^{SVG} - \min(M_i^{SVG}, M_j^{SVG}))} \quad (1)$$

Figure 5A:
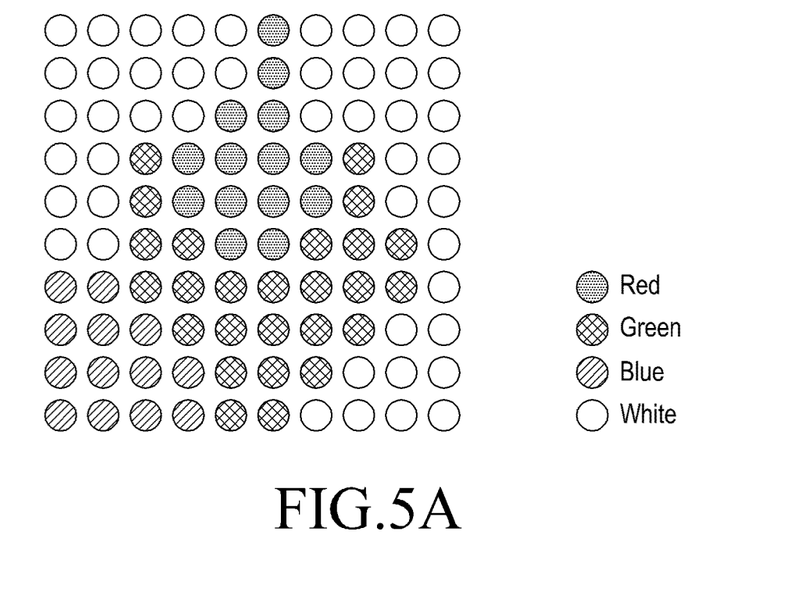
FIGS. 5A and 5B illustrate an example of a Modified Color Adjacency Graph (MCAG) generation according to an embodiment of the present invention.
Figure 5B:
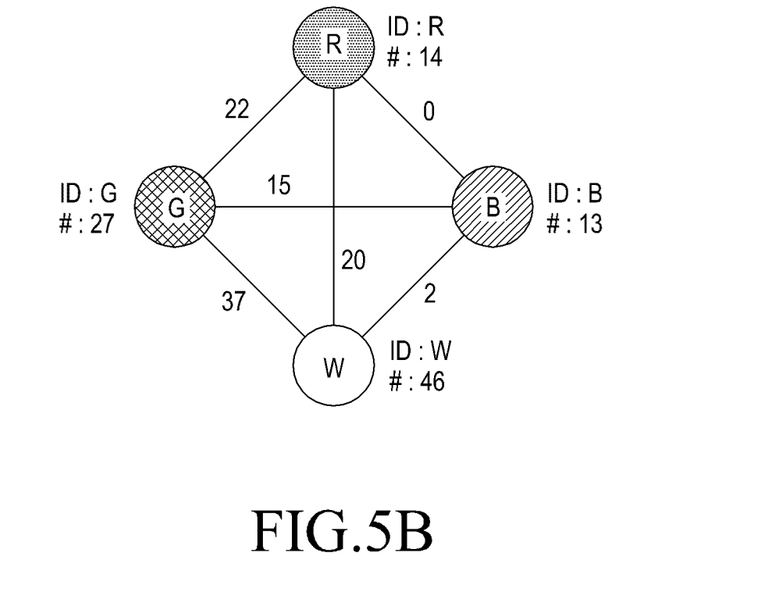
Figure 6A:
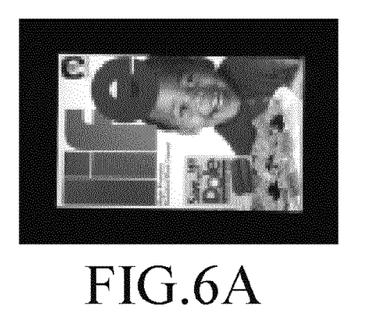
FIGS. 6A and 6B are views illustrating Spatial Variance Graph (SVG) generation according to an embodiment of the present invention.
Figure 6B:
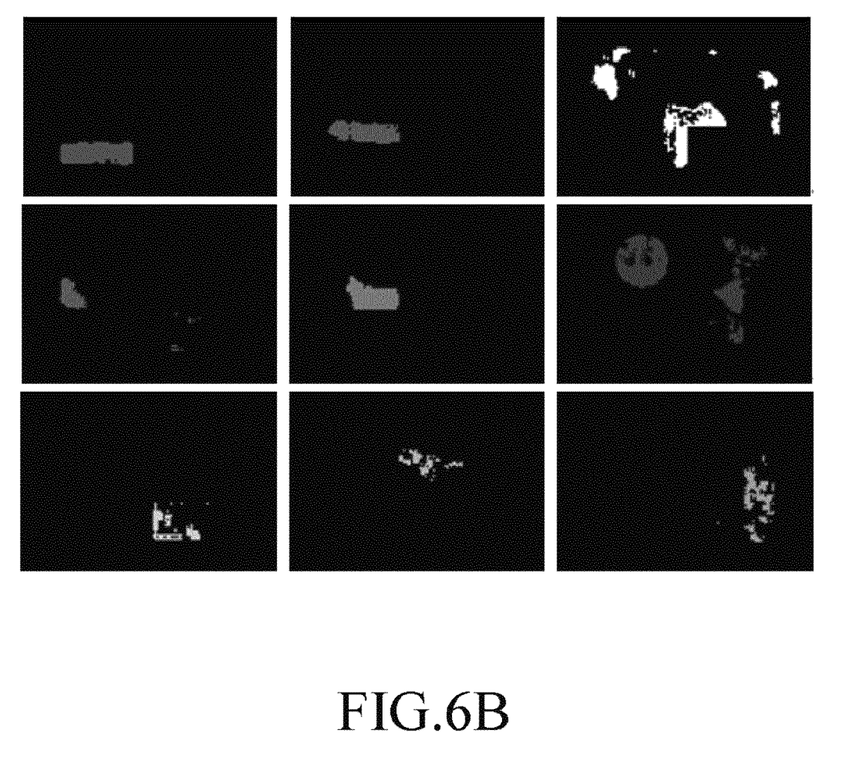

In Equation (1), "i" and "j" represent image numbers, $M_i^{MCAG}$ represents an MCAG of an $i^{th}$ image, and $M_i^{SVG}$ represents an SVG of an $i^{th}$ image. Additionally, it is possible to give weights to two graphs using $\alpha$ and $\beta$, wherein, generally, the similarity levels may be calculated with weights set as the same value of 0.5. FIGS. 5A and 5B illustrate an example of an MCAG generation, respectively, wherein FIG. 5A illustrates an original image, and FIG. 5B illustrates a result of MCAG generation. FIGS. 6A and 6B illustrate a result of an SVG, wherein FIG. 6A illustrates an original image, and FIG. 6B illustrates SVG nodes.

The important image selector 11 calculates similarity levels between each image and the other respective images with respect to all input images by means of Equation (1). The important image selector 11 then combines similarity levels calculated in connection with each image, and determines a final similarity level of the image. A similarity value calculated by Equation (1) becomes smaller as the two related images include more similar information, that is, as the similarity level between the two related images increases. In contrast, a similarity value calculated by Equation (1) becomes larger as two related images include more different information from each other, that is, as a similarity level between the two related images decreases. Therefore, as the final similarity value increases, a corresponding image has a higher probability of including unique information as compared to other images. For this reason, the important image selector 11 selects an image, the final similarity value of which is large, as an important image.

The important image selector 11 detects facial regions from each input image, and calculates the sizes and the number of the facial regions when having detected the facial regions.

The important image selector 11 then gives importance weights according to an entropy, a similarity level, presence or absence of a facial region, the number of facial regions, and sizes of facial regions, which have been detected from each image, and then selects a part of input images as important images.

For example, the important image selector 11 may select an image including the largest facial region, an image having the highest entropy, an image including the largest number of facial regions, or an image from which the lowest similarity level is obtained through the calculation of similarity levels between input images, as an important image having the highest importance level. Then, after selecting one image, the important image selector 11 selects an image, which has a high entropy, includes a large facial region, and has a large difference from the previously selected image, from among the remaining images, as the next ranking image, and this procedure may be repeated.

As described in step 103, the Region-Of-Interest detector 12 sets an ROI in each important image selected by the important image selector 11. According to an embodiment of the present invention, entropy distribution of each image is used to detect an ROI. Accordingly, the Region-Of-Interest detector 12 partitions each important image into a plurality of blocks, calculates entropies of all pixels, and calculates an entropy according to each block. The entropy of each pixel may be calculated using both methods, which are used to calculate the entropy of each image in the step of extracting important images.

Thereafter, the Region-Of-Interest detector 12 sets a block having the highest entropy in each important image as an initial ROI. However, when an important image includes a facial region, the facial region may be set as an initial ROI. Accordingly, in the case of an image from which a facial region is detected, the Region-Of-Interest detector 12 sets an entropy of a block including the facial region as the largest value, and sets the corresponding block as an initial ROI.

Figure 7A:
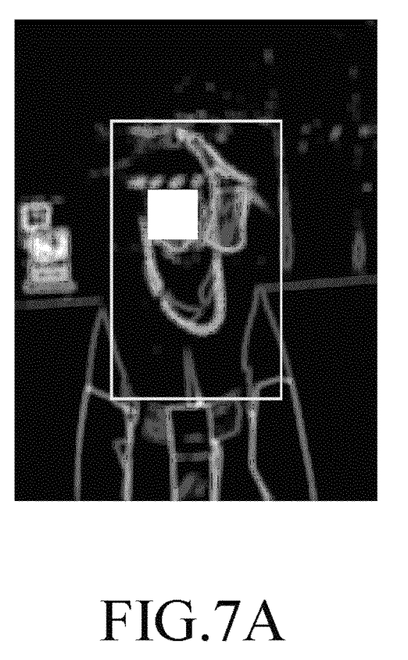
FIGS. 7A and 7B illustrate the results of setting of ROIs according to an embodiment of the present invention.
Figure 7B:
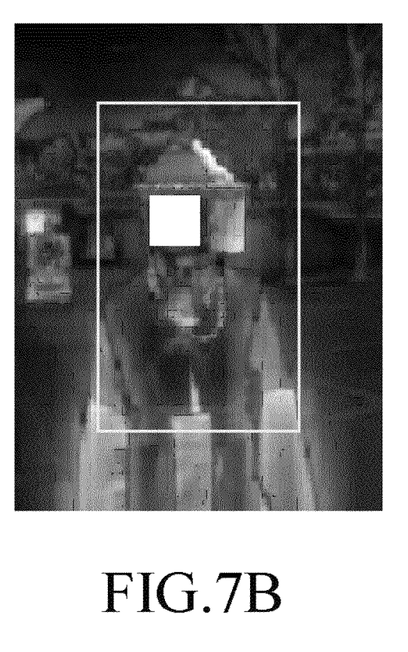
Figure 8A:
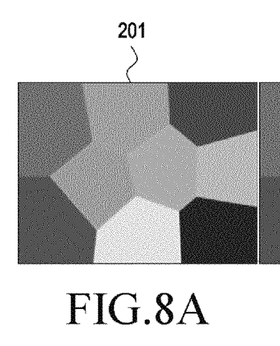
FIG. 8 illustrates a procedure of selecting ROIs in a canvas according to an embodiment of the present invention.
Figure 8B:
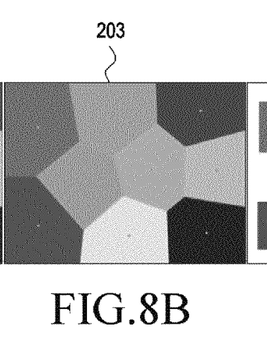
Figure 8C:
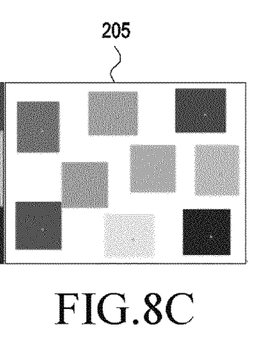
Figure 8D:
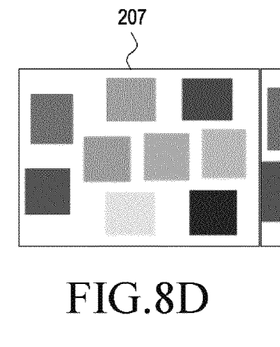
Figure 8E:
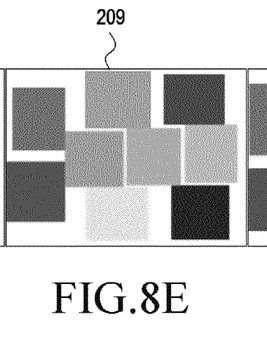
Figure 8F:
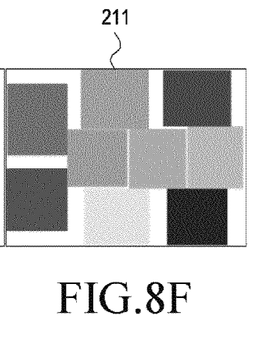

With the initial ROI as a center, the Region-Of-Interest detector 12 continuously expands an ROI in a direction showing the highest entropy increase rate in comparison with the number of pixels, among four directions of above, below, right, and left, in which the ROI is expandable. The expanding of each ROI is terminated when the ROI includes information of a predetermined threshold value. FIGS. 7A and 7B illustrate examples in which ROIs are set, wherein FIG. 7A illustrates a result obtained when an ROI is set based on a local entropy with respect to an image shown in FIG. 4A, and FIG. 7B illustrates a result obtained when an ROI is set based on a saliency map with respect to an image shown in FIG. 4A.

The image composer 13 performs operations corresponding to steps 105 and 107. That is, the image composer 13 selects the ROIs of important images, which have been detected by the Region-Of-Interest detector 12, on a canvas for composition into a collage image. In order to efficiently and evenly select the ROIs of multiple important images on one canvas, without overlapping with each other, the image composer 13 sets an initial position of each ROI based on a K-means clustering algorithm. In this case, the initial position based on the K-means clustering algorithm is randomly determined so that image selection of a similar form cannot be generated when selection of ROIs is repeatedly performed. The image composer 13 selects an image having a highest importance level in a cluster located at the center of the canvas, and selects the remaining images in the remaining clusters in regular sequence after arranging height-to-width ratios of bounding boxes of the remaining clusters and height-to-width ratios of ROIs in order of size.

After selecting the ROIs of the important images on the canvas through the aforementioned procedure, the image composer 13 expands the size of each ROI until reaching the boundary of an adjacent ROI so that ROIs can occupy areas of the same size in the canvas. In this case, the ROI of an image having a highest importance level is given a weight to occupy a wider area than those of the other images in the canvas. Thereafter, the image composer 13 checks if there is a spare space around each ROI in the canvas. When there is a spare space, the image composer 13 moves the ROI to the spare space based on the current position, and again expands the ROI before ROIs are overlapped with each other. Such expansion and relocation of ROIs may be performed only until every ROI can be expanded, or may be performed repeatedly with respect to an ROI which is expandable until there is no ROI which is expandable.

FIG. 8 illustrates a procedure of relocating and expanding ROIs. Referring to FIG. 8, the image composer 13 forms a clustering, such as a canvas 201, by performing a K-means clustering with a random initial position. Then, the image composer 13 determines an initial position for an ROI in each cluster, as shown in a canvas 203. Next, as shown in a canvas 205, the image composer 13 selects each ROI at each initial position, and exposes each ROI to the maximum size possible. In the canvas 205, a plurality of quadrangles represent ROIs, and the remaining area corresponds to spare space of the canvas. Since there is spare space in the canvas, the image composer 13 moves the ROIs to the middle of the spare space, as shown in a canvas 207. Next, the image composer 13 expands the ROIs as much as possible, as shown in a canvas 209. A final result obtained from the aforementioned procedure is shown in a canvas 211.

While the aforementioned procedure has been described on a case where ROIs are selected and expanded by taking the spare space of a canvas into consideration, it is possible to move the positions of the ROIs in another scheme, for example, by taking the entire size of important images selected in a canvas into consideration. Also, when a part occupied by an image is found in a canvas, the image composer 13 may move an ROI to an optimum position within a movable range thereof by taking the entire region of a specific image and the entire region of adjacent images into consideration, thereby being able to minimize an empty area of the canvas.

When selection of the ROIs has been completed, the image composer 13 composes important images corresponding the ROIs into one collage image. According to an embodiment of the present invention, a linear image composition method or a weight map composition method using a cumulative distribution function is used to perform a composition operation into a collage image.

The linear image composition method uses weights for distances between important images and weights for important images themselves as composition weights. The weights for distances between important images are determined as follows. With respect to each pixel on a canvas, the image composer 13 searches for relevant important images, which can exert an influence on the current pixel, and calculates the minimum distance between the position of the current pixel and the ROI of each relevant important image. Here, each relevant important image corresponds to an important image located at a corresponding pixel. The image composer 13 then sets the weight for a relevant important image, for which the calculated distance is the shortest, among the relevant important images to have a maximum value, and sets the weights of the remaining relevant important images to have values inversely proportional to distances in which images are composed.

Figure 9A:
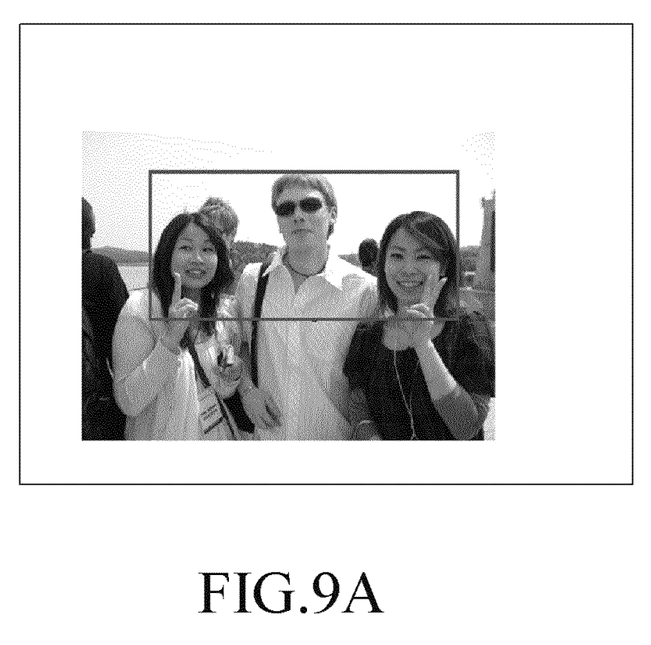
FIGS. 9A and 9B illustrate a result of weight application to an image for composition according to an embodiment of the present invention.
Figure 9B:
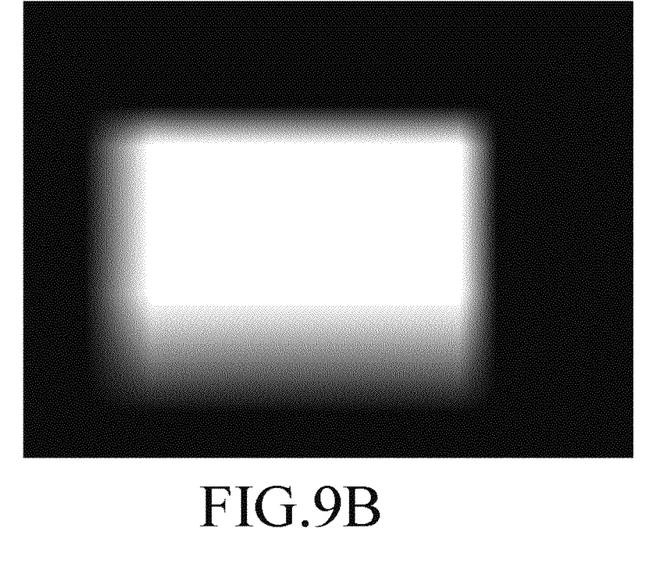

With respect to the weights of each image itself, the weight of a part occupied by an ROI in the image is set to have the maximum value, and the weights of the remaining parts are set to decrease linearly as approaching the boundary of the image. FIGS. 9A and 9B illustrate the location of an image in a canvas, and weights of the image itself.

The image composer 13 composes the important images using the weights based on distances and the weights of each image itself, which have been calculated as described above. For example, when important images connected with a specific pixel on a canvas include an important image A and an important image B, the image composer 13 gives each important image a weight according to the distance between the specific pixel and an ROI of the important image, gives each important image a weight of the important image itself, and determines the final composition weight for each image by combining the two weights. Thereafter, a corresponding composition weight is applied to each pixel value for pixels of important images A and B, corresponding to the specific pixel, so that the final pixel value of the specific pixel is determined.

The weight map (e.g., an alpha map) composition method using a Cumulative Distribution Function (CDF) is as follows. First, it is assumed that there are one-dimensional straight lines extending from an ROI in every direction, wherein each straight line starts at a boundary of an ROI, and extends until the straight line meets with a boundary of a corresponding important image or with an ROI of another important image. With values of an importance map (e.g., saliency map) of straight lines, obtained as above, it is possible to obtain a cumulative distribution which is continued from a boundary to a start point of each straight line, which can be used as image composition weights.

Figure 10:
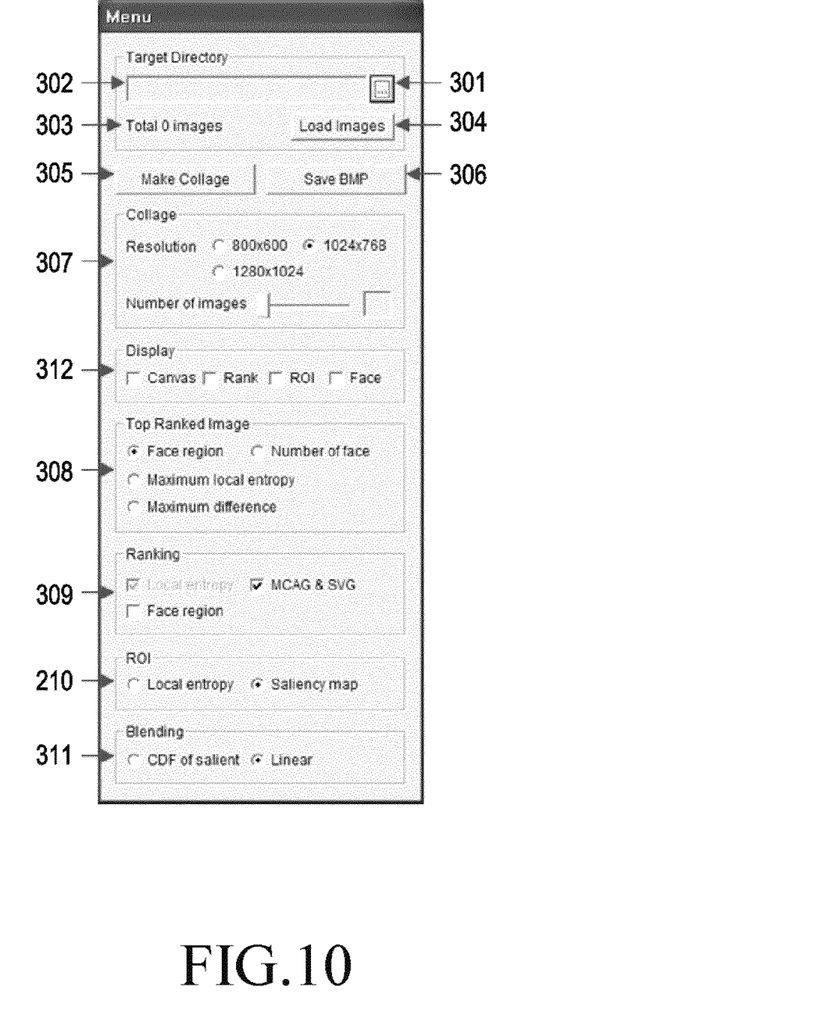
FIG. 10 illustrates a menu for composition into a collage image according to an embodiment of the present invention.

With the aforementioned construction according to the present invention, a method for generating a collage image will now be described in detail with reference to FIGS. 10 to 15. FIG. 10 illustrates a user interface for composition into a collage image according to an embodiment of the present invention.

With the user interface for composition into a collage image, as shown in FIG. 10, the user can select a folder storing images by means of an open button 301, wherein the image processing unit 10 displays the name of the selected folder on a route window 302. Then, the image processing unit 10 displays the number of images included in the folder on a total number text section 303. The user can request loading of the images of the folder by means of a load button 304, can request generation of a collage image by means of a collage image generation button 305, and can request storing of a generated collage image by means of a storage button 306.

Additionally, the user can select the number of important images and a resolution of a collage image to be generated through a collage box 307, and can select selection criteria for important images and a usage algorithm through a first selection criterion box 308 and a second selection criterion box 309. Here, the number of important images may be determined to be two or more. The user can select a method for calculating entropies of important images through a region-of-interest box 310, and can set a final image composition scheme through a composition scheme box 311. Also, the user can select a type of information to be displayed on a screen using a display box 312. Moreover, the user can control the positions and sizes of images existing in a program.

When the load button 304 is pressed by the user, the image processing unit 10 determines images stored in a folder selected by the window 302 to be input images, selects important images by calculating an entropy, a similarity level, and the like of each input image according to important image selection criteria and a usage algorithm, which are set by the first selection criterion box 308, the second selection criterion box 309, and the region-of-interest box 310, and then sets ROIs of the selected important images. The image processing unit 10 then selects ROIs on a canvas, and displays the ROIs with the canvas on a screen when the selection has been completed.

Accordingly, the user can confirm the selection of important images. When desiring to change the selection of the important images, the user may directly change the selection of the important images using a device, such as a mouse, or may request relocation of the important images.

Thereafter, as the collage image generation button 305 is pressed by the user, the image processing unit 10 generates a collage image by calculating composition weights in a scheme, which is set by the composition scheme box 311, and displays the generated collage image on the screen. When the storage button 306 is pressed by the user, the generated collage image is stored.

Figure 11:
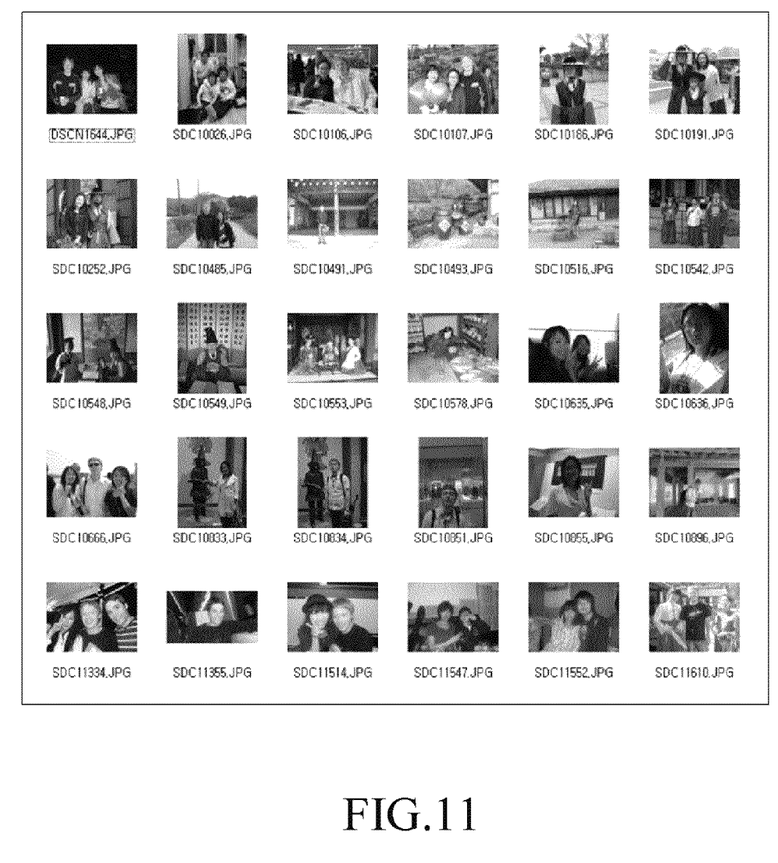
FIG. 11 illustrates an example of input images according to an embodiment of the present invention.
Figure 12A:
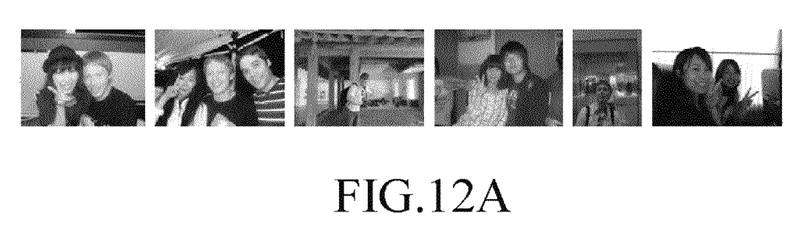
FIGS. 12A to 12C illustrate examples of selected important images according to an embodiment of the present invention.
Figure 12B:
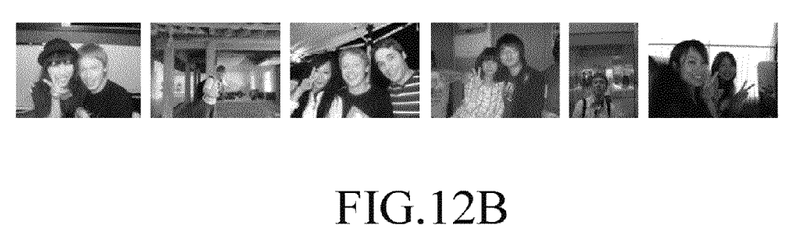
Figure 12C:
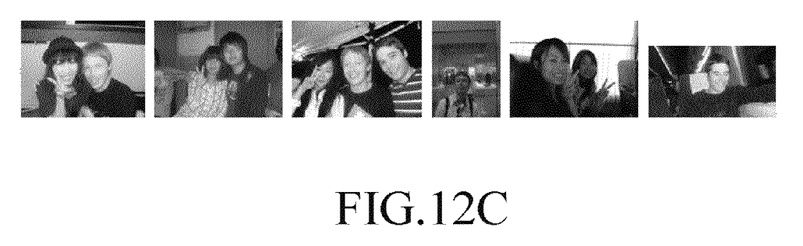

For example, when 30 input images are selected as shown in FIG. 11, and the number of important images are set to six, six important images may be selected as shown in FIGS. 12A to 12C. FIGS. 12A to 12C illustrate important images which are arranged in order of importance level based on different selection criteria.

FIG. 12A illustrates important images selected when only entropies of images are used as selection criteria, and FIG. 12B illustrates important images selected when entropies of images and similarity levels between images are used as selection criteria. Further, FIG. 12C illustrates important images selected when entropies of images, similarity levels between images, and sizes of facial regions are used as selection criteria.

Figure 13:
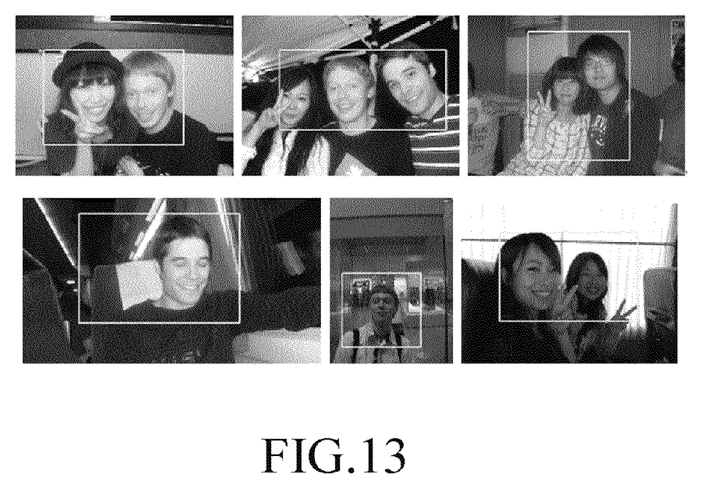
FIG. 13 illustrates ROIs of important images, which are determined according to an embodiment of the present invention.
Figure 14:
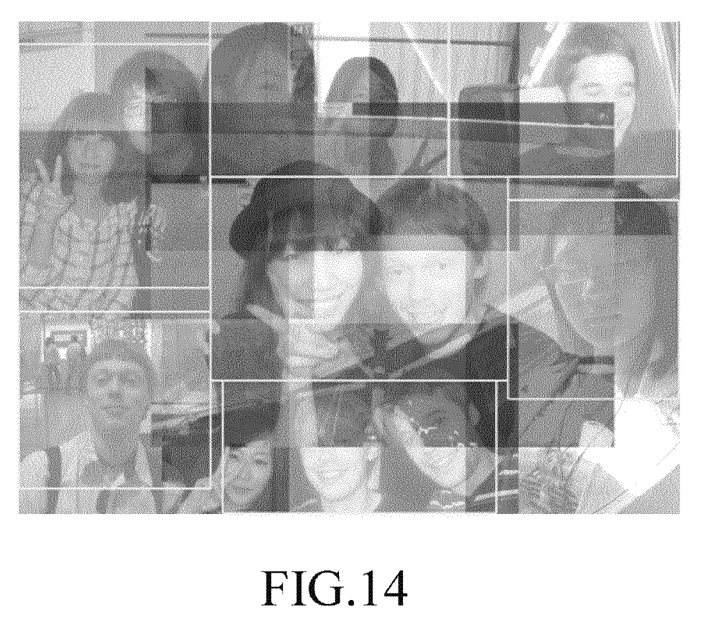
FIG. 14 illustrates important images selected in a collage canvas according to an embodiment of the present invention.
Figure 15:
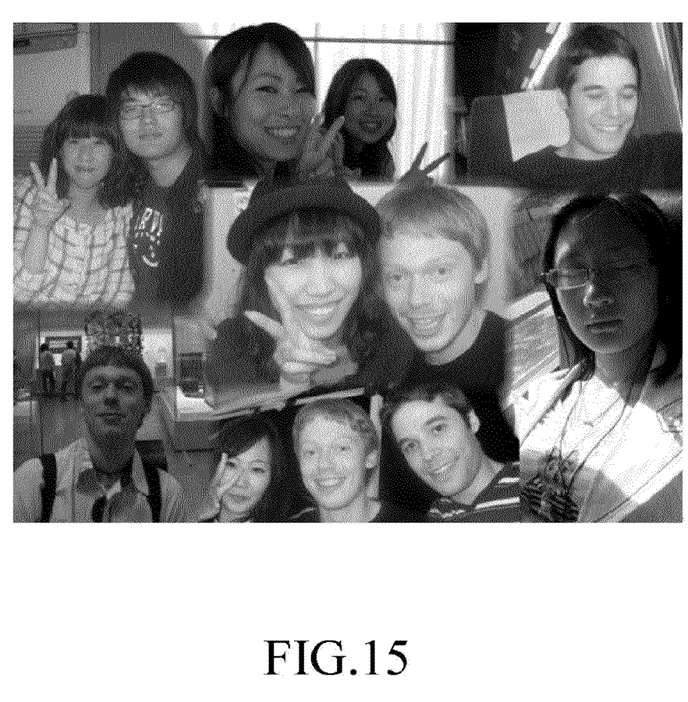
FIG. 15 illustrates a collage image composed according to an embodiment of the present invention.

FIG. 13 is a view illustrating ROIs detected in the important images of FIG. 12C. FIG. 14 illustrates the selection of ROIs of nine important images, which are composed by adding three important images to the important images of FIG. 12C. FIG. 15 illustrates a collage image generated by composing important images which are arranged according to ROIs selected as shown in FIG. 14.

While the invention has been shown and described with reference to certain embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

According to an embodiment of the present invention, it is possible to rapidly and efficiently compose a plurality of images into one image through a simple algorithm, and such a method enables a resultant collage image to have high quality.

What is claimed is:

1. A method for composing a plurality of images into one image in an image processing apparatus, the method comprising the steps of:
calculating importance levels of a plurality of input images, respectively, according to selection criteria, and selecting at least two important images from among the plurality of input images according to the calculated importance levels;
determining Regions Of Interest (ROIs) of the important images;
selecting positions of the ROIs in one canvas; and
arranging corresponding important images at the selected positions of the ROIs, and composing the arranged important images into one image.

2. The method of claim 1, wherein the selection criteria comprises at least one selected from the group consisting of an entropy of each image, a similarity level between images, a number of facial regions included in each image, and sizes of the facial regions included in each image.

3. The method of claim 1, wherein selecting important images comprises:
calculating similarity levels between each input image and each of remaining input images with respect to each of the plurality of input images when the selection criteria include a similarity level of each image;
determining a final similarity level of a corresponding input image using the calculated similarity levels;
selecting an image having a lowest similarity level among the plurality of input images as an important image; and
selecting an image having a lowest similarity level, in comparison with a previously selected important image, as a next important image.

4. The method of claim 1, wherein selecting important images comprises:
detecting sizes of facial regions included in each of the plurality of input images when the selection criteria include sizes of facial regions included in each image; and
determining importance levels of the input images in proportion to the sizes of the facial regions.

5. The method of claim 1, wherein each ROI is determined according to a position of a facial region included therein and entropy distribution of a related important image.

6. The method of claim 5, wherein determining ROIs comprises:
partitioning a corresponding important image into a plurality of blocks, and calculating an entropy corresponding to each of the plurality of blocks;
setting a value of a block in which a facial region is located to a settable maximum entropy value when the corresponding important image includes the facial region;
setting a block having a largest entropy value among the plurality of blocks as an initial ROI; and
continuously expanding an ROI in a direction showing a highest entropy increase rate in comparison with a number of pixels, among four directions of above, below, right, and left, in which the ROI is expandable, with the initial ROI as a center, until a final ROI includes information of a threshold value.

7. The method of claim 1, wherein selecting the ROIs in one canvas comprises:
partitioning the one canvas using a K-means clustering scheme, to arrange height-to-width ratios of bounding boxes of clusters and height-to-width ratios of the ROIs, respectively, in order of size;
selecting the ROIs in the clusters in regular sequence.

8. The method of claim 1, wherein selecting positions of the ROIs in one canvas comprises:
selecting initial positions of the ROIs in the one canvas;

changing positions of the ROIs based on the initial positions, and expanding sizes of the ROIs until boundaries of the ROIs are adjacent to each other.

9. An apparatus for composing a plurality of images into one image, the apparatus comprising:

a memory unit for storing a plurality of input images; and an image processing unit for calculating importance levels of the plurality of input images, respectively, according to selection criteria, selecting at least two important images from among the plurality of input images according to the calculated importance levels, determining Regions Of Interest (ROIs) of the important images, selecting positions of the ROIs in one canvas, arranging corresponding important images at the selected positions of the ROIs, and composing the arranged important images into one image.

10. The apparatus of claim 9, wherein the selection criteria comprises at least one selected from the group consisting of an entropy of each image, a similarity level between images, a number of facial regions included in each image, and sizes of the facial regions included in each image.

11. The apparatus of claim 9, wherein the image processing unit calculates similarity levels between each input image and each of remaining input images with respect to each of the plurality of input images when the selection criteria include a similarity level of each image, determines a final similarity level of a corresponding input image using the calculated similarity levels, selects an image having a lowest similarity level among the plurality of input images as an important image, and selects an image having a lowest similarity level, in comparison with the selected important image, as a next important image.

12. The apparatus of claim 9, wherein the image processing unit detects sizes of facial regions included in each of the plurality of input images when the selection criteria include sizes of facial regions included in each image, and determines importance levels of the input images in proportion to the sizes of the facial regions.

13. The apparatus of claim 9, wherein each ROI is determined according to a position of a facial region included therein and entropy distribution of a related important image.

14. The apparatus of claim 13, wherein the image processing unit partitions a corresponding important image into a plurality of blocks, calculates an entropy corresponding to each of the plurality of blocks, sets a value of a block in which a facial region is located to a settable maximum entropy value when the corresponding important image includes the facial region, sets a block having a largest entropy value among the plurality of blocks as an initial ROI, and continuously expands an ROI in a direction showing a highest entropy increase rate in comparison with a number of pixels, among four directions of above, below, right, and left, in which the ROI is expandable, with the initial ROI as a center, until a final ROI includes information of a threshold value.

15. The apparatus of claim 9, wherein the image processing unit partitions the one canvas using a K-means clustering scheme, arranges height-to-width ratios of bounding boxes of clusters and height-to-width ratios of the ROIs, respectively, in order of size, and selects the ROIs in the clusters in regular sequence.

16. The apparatus of claim 9, wherein the image processing unit repeats to select initial positions of the ROIs in the one canvas, to change positions of the ROIs based on the initial positions, and to expand sizes of the ROIs until boundaries of the ROIs are adjacent to each other.

\* \* \* \* \*